US008028274B2

(12) United States Patent
Bliven, II et al.

(10) Patent No.: US 8,028,274 B2
(45) Date of Patent: Sep. 27, 2011

(54) INTEGRATING LOOSELY COUPLED TOOLS USING CONTRACTS AND REFERENCES

(75) Inventors: Andrew Willis Bliven, II, Bellevue, WA (US); Ian Bavey, Sammamish, WA (US); Jack Greenfield, Redmond, WA (US); Frank Fan, Redmond, WA (US); David Trowbridge, Enumclaw, WA (US); David S. Noble, Redmond, WA (US); Michael Hayton, Kirkland, WA (US); Vinay Bharadwaj, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 11/823,163

(22) Filed: Jun. 27, 2007

(65) Prior Publication Data
US 2009/0007069 A1 Jan. 1, 2009

(51) Int. Cl.
*G06F 9/44* (2006.01)
(52) U.S. Cl. ...................................... 717/120
(58) Field of Classification Search .......... 717/100–102, 717/120–121
See application file for complete search history.

(56) References Cited

U.S. PATENT DOCUMENTS

| 5,546,584 A | 8/1996 | Lundin et al. |
| 6,115,040 A | 9/2000 | Bladow et al. |
| 6,640,151 B1 | 10/2003 | Somekh et al. |
| 2002/0111922 A1 | 8/2002 | Young et al. |
| 2003/0105887 A1* | 6/2003 | Cox et al. ...................... 709/328 |
| 2005/0081100 A1 | 4/2005 | Zeng et al. |
| 2006/0080670 A1 | 4/2006 | Lomet |
| 2006/0112397 A1 | 5/2006 | Raghunandan et al. |
| 2006/0294430 A1* | 12/2006 | Bunker et al. .................. 714/38 |
| 2007/0006171 A1 | 1/2007 | Raghunandan et al. |

OTHER PUBLICATIONS

"'C' Programmable Application Development Module", http://www.prosoft-technology.com/content/view/full/6996, Mar. 28, 2007.
Cheng, et al., "Building Collaboration into IDEs", Date: 2003, pp. 40-50, vol. 1, Issue: 9, ACM Press, NY, USA.
Croft, et al., "Loosely-Coupled Integration of a Text Retrieval System and an Object-Oriented Database System", Proceedings of the 15th annual international ACM SIGIR conference on Research and development in information retrieval, Date: 1992, pp. 223-232, ACM Press, NY, USA.
Zwolinski, et al., "The ALFA Simulation Backplane", pp. 1-5, 1994.

* cited by examiner

*Primary Examiner* — Wei Zhen
*Assistant Examiner* — Lanny Ung

(57) ABSTRACT

Various technologies and techniques are disclosed for providing an integration framework that enables tools to be integrated. The integration framework enables tools participating in the framework to be encapsulated in a manner that hides their implementations, thereby preventing them from taking deep dependencies on each other. The integration framework also enables the tools participating in the framework to carry formal type definitions called service and data contracts that describe the public behaviors they offer. The integration framework also provides support for migrating integration logic from tools into pluggable commands to further reduce coupling between the tools.

16 Claims, 8 Drawing Sheets

INTEGRATING LOOSELY COUPLED TOOLS USING CONTRACTS AND REFERENCES

BACKGROUND

Various tools exist today to allow users to develop software and related resources, such as the software and resources that comprise web sites, web services and client applications. Some tool vendors integrate the functionality of their particular tool with the functionality of separate tools offered by the same or other companies. The integration between tools allows their features to be used in some useful combination. One problem with the way such tools are integrated is that the tools are usually tightly coupled, with each tool depending on specific implementation details of the other. This means that a change to one of the tools often breaks the integration, requiring the other tool to also be reworked and recompiled to account for the changes.

SUMMARY

Various technologies and techniques are disclosed for providing an integration framework that enables tools to be integrated. The framework implements a service oriented architecture, enabling tools participating in an integration to be encapsulated in a manner that hides their implementations, thereby preventing them from taking deep dependencies on each other. In one implementation, this can be accomplished by enabling the tools participating in an integration to carry formal type definitions called service and data contracts that describe the public behaviors they offer. The framework also supports pluggable commands that can be used to implement behaviors that involve one or more of the tools, required to support integration scenarios. Integration logic can be migrated from tools into commands to further reduce coupling between the tools.

In one implementation, the framework uses a broker called a backplane to facilitate integration between the tools. A client, such as a command or a tool, can ask the backplane for a service conforming to a given contract offered by a tool that manages information in a given scope. The client can then call methods on the service to invoke the behaviors of the tool, causing it to read or write some of the information it is managing. This approach hides the tool that offers the contract from the client, so that the client depends only on the contract and not on the implementation of the tool.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a framework for integrating tools, but the technologies and techniques also serve other purposes in addition to these. In one implementation, one or more of the techniques described herein can be implemented as features within a program such as MICROSOFT® VISUAL STUDIO®, or from any other type of program or service that provides mechanisms for allowing tools to integrate with each other.

In one implementation, a system is provided that enables tools participating in an integration framework to be encapsulated in a manner that does not expose implementation details. The term "integration framework" as described herein is meant to include a platform or program that provides features that can be used by various tools to integrate with one another. By not exposing implementation details in the tools that participate in the integration framework, tools can avoid taking deep dependencies on each other. Tools participating in the integration framework carry formal type definitions called service and data contracts that describe the public behaviors they offer.

Figure 1:
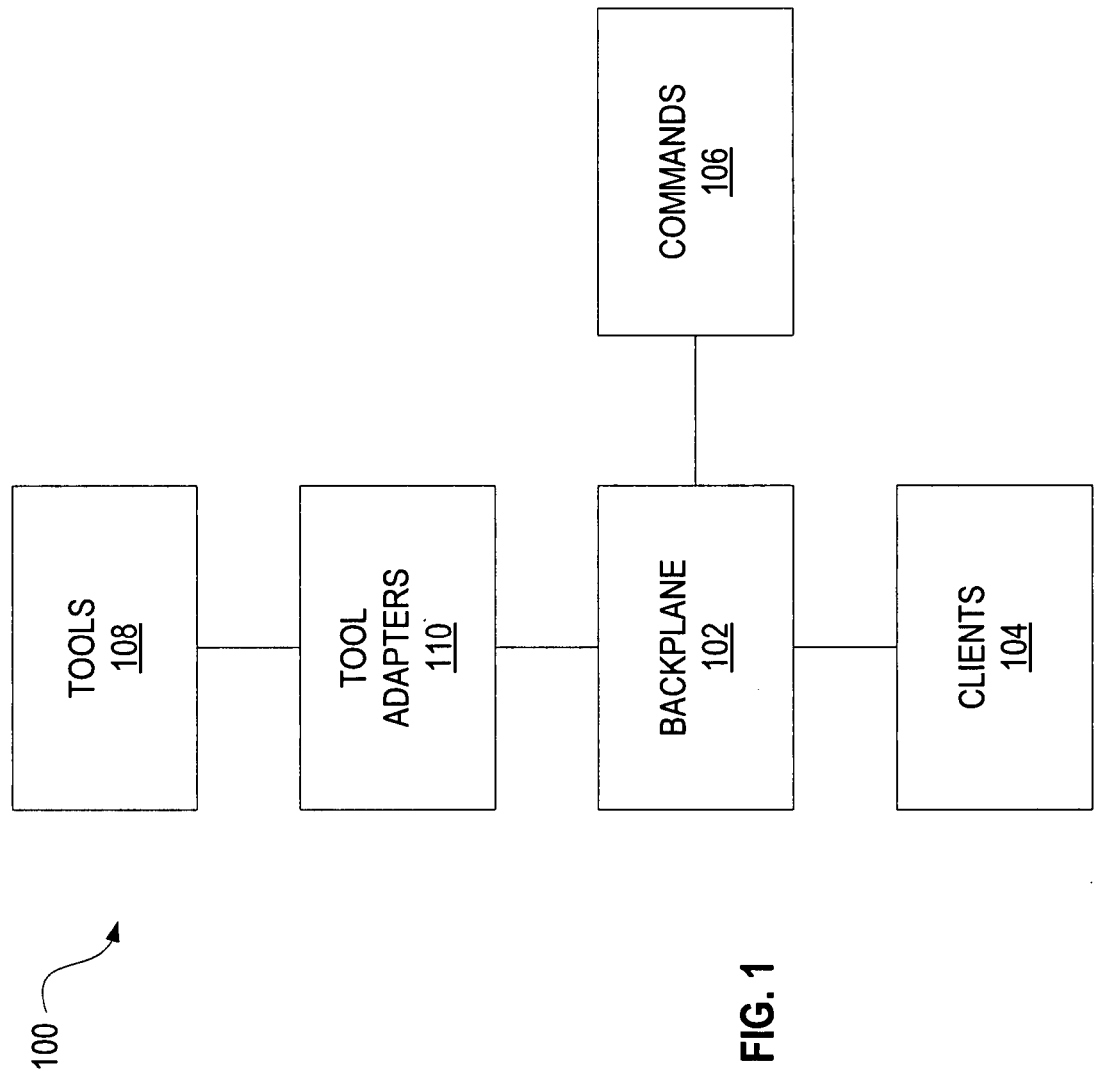
FIG. 1 is a diagrammatic view of a system for integrating tools.

FIG. 1 is a diagrammatic view of a system 100 for integrating tools using an integration framework. The system includes a backplane 102, one or more client(s) 104, commands 106, tools 108, and tool adapters 110. The framework uses a backplane 102 to facilitate the integration between the tools. A client 104 can ask the backplane 102 for a service conforming to a given contract offered by a tool 108 that manages information in a given scope. The client 104 can then call methods on the service to invoke the behaviors of the tool 108, causing it to read or write some of the information it is managing. This approach hides the tool 108 that offers the contract from the client 104, so that the client 104 depends only on the contract and not on the implementation of the tool 108. Clients 104 can include commands 106, tools 108 and other objects. Clients 104 can also use commands 106 to read or write information in one or more tools 108. Commands 106 are reusable units of behavior that can act upon one or more tools 108. Tools 108 can be any designer, object model, or service. Tools 108 that were not designed to collaborate can be adapted to work with the backplane 102 by tool adapters 110.

Figure 2:
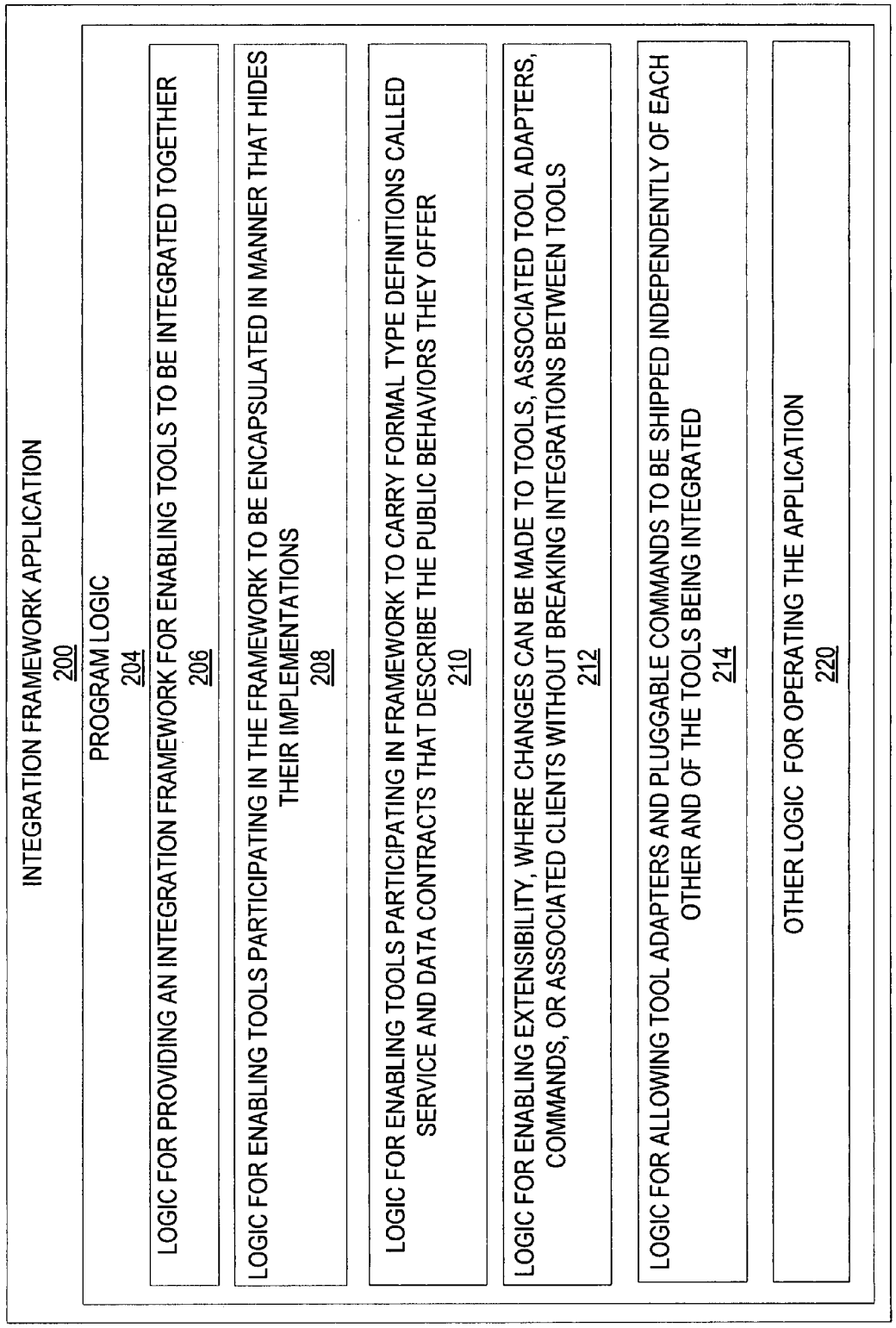
FIG. 2 is a diagrammatic view of an integration framework application of one implementation operating on the computer system of FIG. 8.

Turning now to FIG. 2, an integration framework application 200 operating on a computing device (500 on FIG. 8) is illustrated. In one implementation, integration framework application 200 is one of the application programs that reside on computing device (500 on FIG. 8). However, it will be understood that integration framework application 200 can alternatively or additionally be embodied as computer-executable instructions on one or more computers and/or in different variations than shown on FIG. 8. Alternatively or additionally, one or more parts of integration framework application 200 can be part of system memory (504 on FIG. 8), on other computers and/or applications (515 on FIG. 8), or other such variations as would occur to one in the computer software art.

Integration framework application 200 includes program logic 204, which is responsible for carrying out some or all of the techniques described herein. Program logic 204 includes logic for providing an integration framework for enabling tools to be integrated 206 (as described below with respect to FIG. 3); logic for enabling tools participating in the framework to be encapsulated in a manner that hides their implementations 208 (as described below with respect to FIGS. 3 and 4); logic for enabling tools participating in the framework to carry formal type definitions called service and data contracts that describe the public behaviors they offer 210 (as described below with respect to FIGS. 3 and 4); logic for enabling extensibility, where changes can be made to tools, associated tool adapters, commands, or associated clients without breaking integrations between tools 212 (as described below with respect to FIGS. 3 and 4); logic for allowing tool adapters and pluggable commands to be shipped independently of each other and of the tools being integrated 214 (as described below with respect to FIG. 5); and other logic for operating the application 220.

Figure 3:
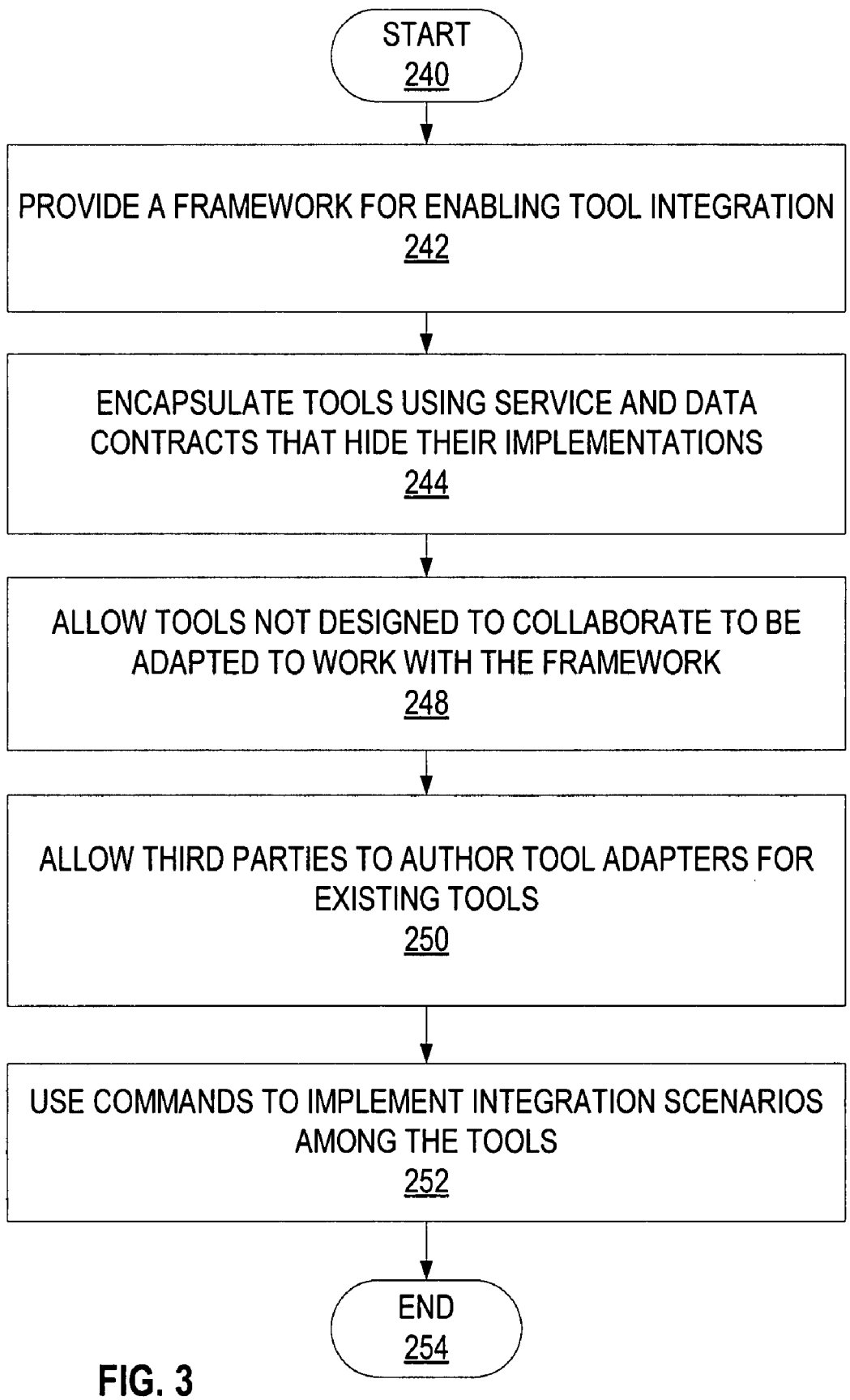
FIG. 3 is a process flow diagram for one implementation of the system of FIG. 1 illustrating the stages involved in providing a flexible integration framework.

Turning now to FIGS. 3-6 with continued reference to FIGS. 1-2, the stages for providing one or more implementations of integration framework application 200 are described in further detail. In some implementations, the processes of FIG. 3-6 are at least partially implemented in the operating logic of a computing device (500 on FIG. 8). FIG. 3 illustrates one implementation of the stages involved in providing a flexible integration framework. It should be noted that while FIG. 3 is described in a flow as a series of stages, there is no particular order intended among the elements. The elements are describing features provided by one implementation of an integration framework. These features are then described in further detail in the other figures herein, starting with FIG. 4.

Figure 4:
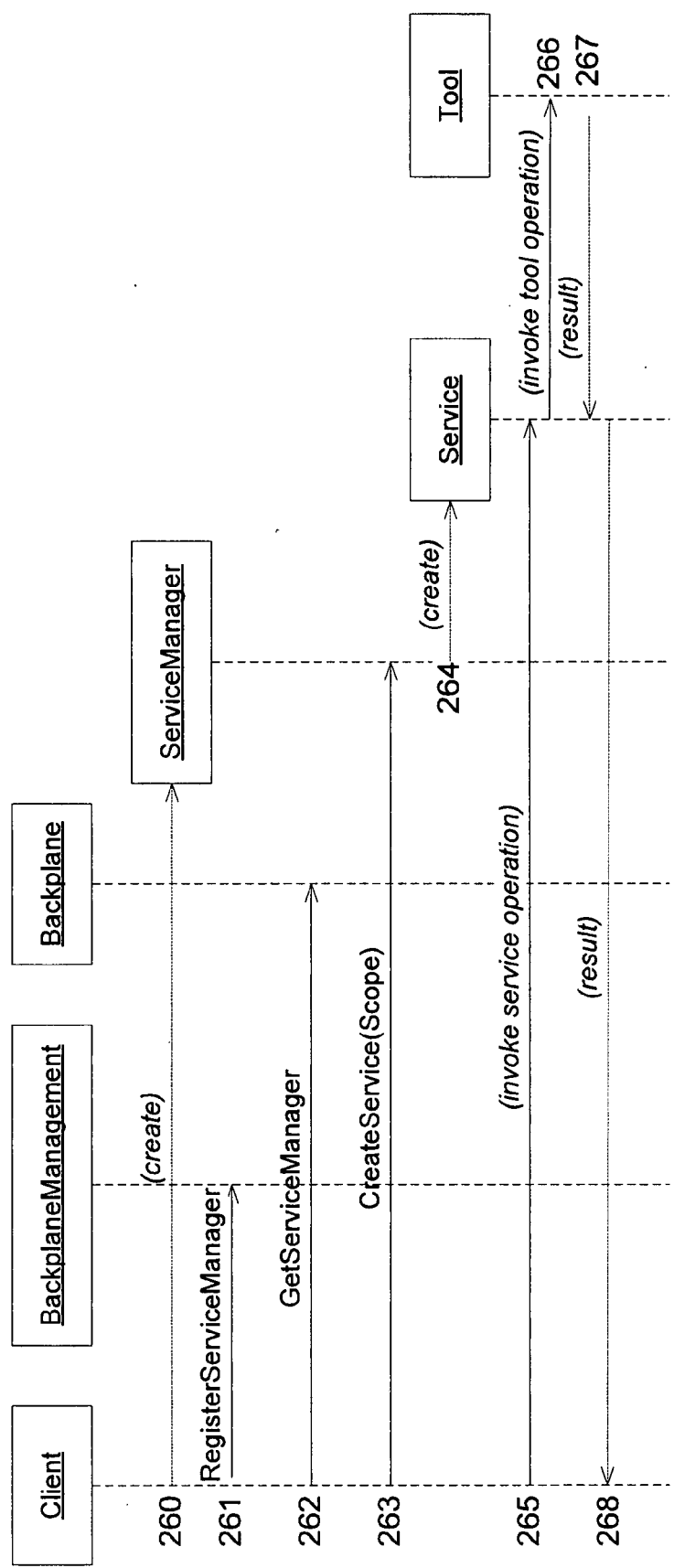
FIG. 4 is a sequence diagram for one implementation of the system of FIG. 1 illustrating the capabilities of a flexible integration framework through one sequence of interactions between system components.

The process begins at start point 240 with providing an integration framework for enabling tool integration (stage 242). Tools are encapsulated by service and data contracts in a manner that hides their implementations (stage 244). Tools that were not designed to collaborate can be made to work with the framework by tool adapters (stage 248). Third parties can author tool adapters for existing tools (stage 250). The term "tool adapter" as used herein is meant to include a platform or program that provides features that allow the public behaviors of a tool to be exposed to other tools through service contracts and/or data contracts. Commands are used to implement integration scenarios among the tools, as described in FIG. 5 (stage 252). The process ends at end point 254. These features and/or techniques will now be described in further detail. FIG. 4 describes a sequence of interactions between the components, while FIGS. 6 and 7 describe how to use a backplane to facilitate integration.

Turning now to FIG. 4, a sequence diagram for one implementation of the system of FIG. 1 is shown that illustrates the capabilities of a flexible integration framework through one sequence of interactions between system components. As shown in FIG. 4, a client (104 on FIG. 1) extends the integration framework by instantiating (stage 260) and registering (stage 261) a ServiceType, one component of a tool adapter. The use of tool adapters allows tools not originally designed to collaborate to be adapted to work with the integration framework (also stage 248 in FIG. 3). Also, tool adapters can be authored by third parties distinct from either the tool or framework provider (also stage 250 in FIG. 3).

The interaction between a client and an integrated tool is illustrated in FIG. 3 stages 262 through 268. The framework provides a mechanism, the GetServiceManager method, to locate the sort of functionality required by the client. Each tool adapter provides the CreateService method to clients to create an instance of the tool to manage information identified by a Scope. The Scope may refer to an artifact, part of an artifact, or a set of artifacts. The client interaction is entirely with the Service provided by the tool adapter (stage 268). The requested behavior is then performed by the tool (stage 266) and the result relayed back to the client (stages 267 and 268).

In this way, tools are encapsulated in a manner that does not expose their implementations (stage 266, also stage 246 on FIG. 3). As described in further detail in other figures, including FIG. 6, a broker called a backplane facilitates integration.

Figure 5:
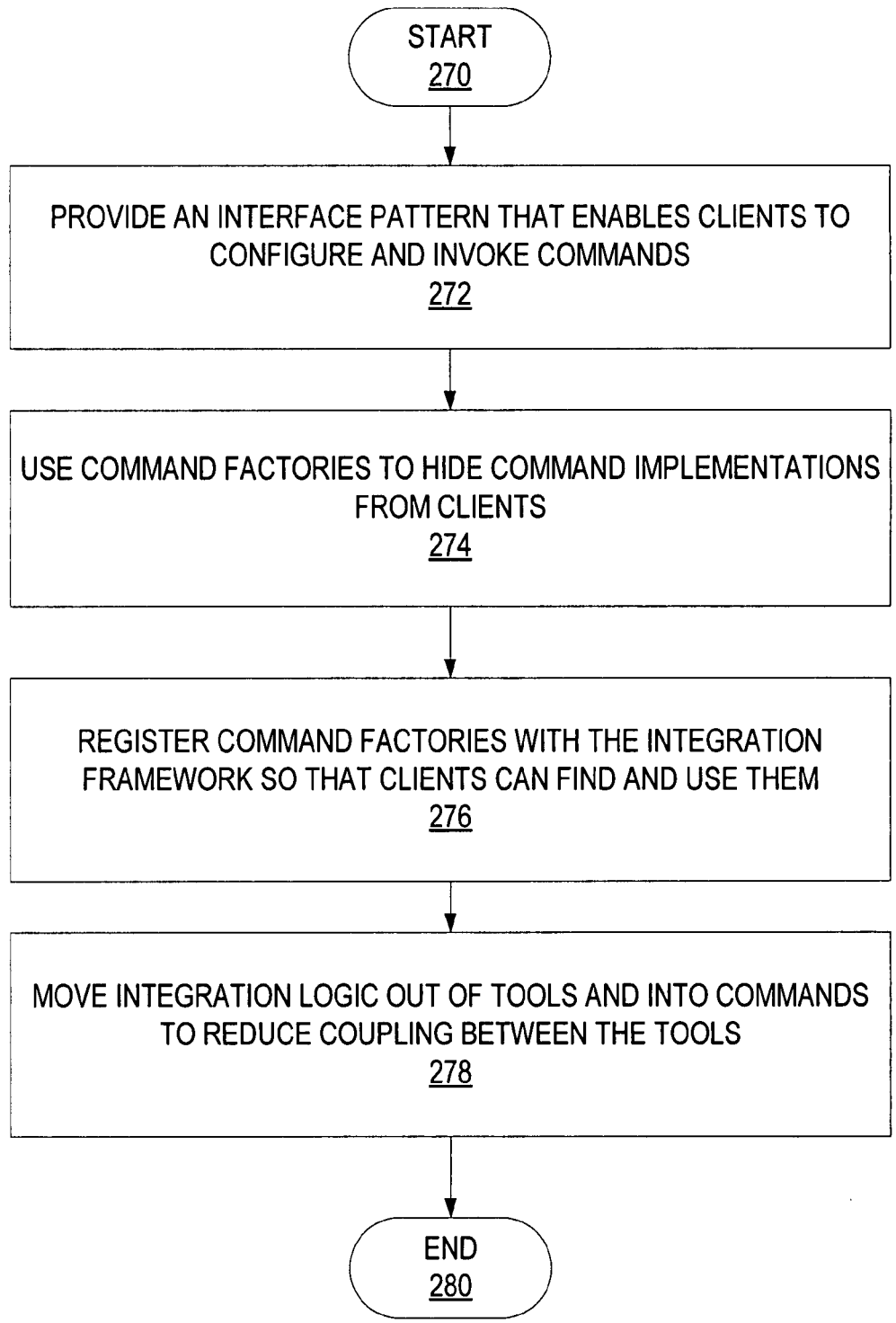
FIG. 5 is a process flow diagram for one implementation of the system of FIG. 1 illustrating the stages involved in providing a framework supporting pluggable external commands.

FIG. 5 illustrates one implementation of the stages involved in providing a framework that supports pluggable external commands. The process begins at start point 270 with providing an interface pattern that enables clients to configure and invoke commands (stage 272). The system uses command factories to hide command implementations from clients (stage 274). Command factories are registered with the integration framework so that clients can find and use them (stage 276). Integration logic is moved out of tools and into commands to reduce coupling between the tools (stage 278). The term "integration logic" as used herein is meant to include logic that facilities the communication and/or exchange of data between tools in the formats they expect. The process ends at end point 280.

Figure 6:
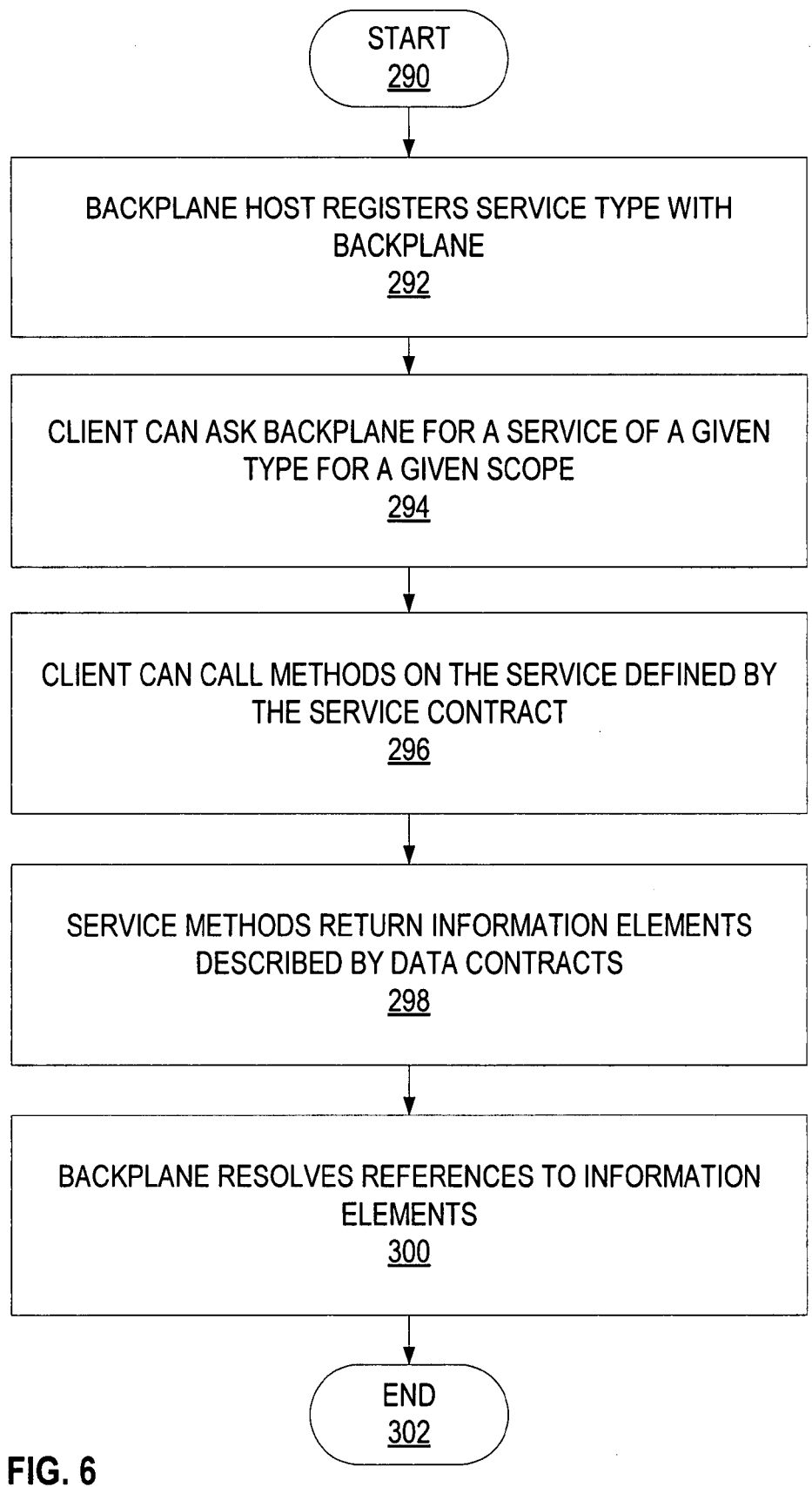
FIG. 6 is a process flow diagram for one implementation of the system of FIG. 1 illustrating the stages involved in using a backplane to facilitate tool integration within the framework.

FIG. 6 illustrates one implementation of the stages involved in using a backplane to facilitate tool integration. The process begins at start point 290 with the object that hosts the backplane registering a service type with the backplane (stage 292). The backplane serves as a broker between clients and tools. The clients can ask the backplane for a service of a given type for a given scope, which the backplane then provides (stage 294). Clients can call methods on the service defined by the service contract (stage 296). Service methods can return information elements described by data contracts (stage 298). The backplane can also resolve references to information elements (stage 300). The process ends at end point 302.

Figure 7:
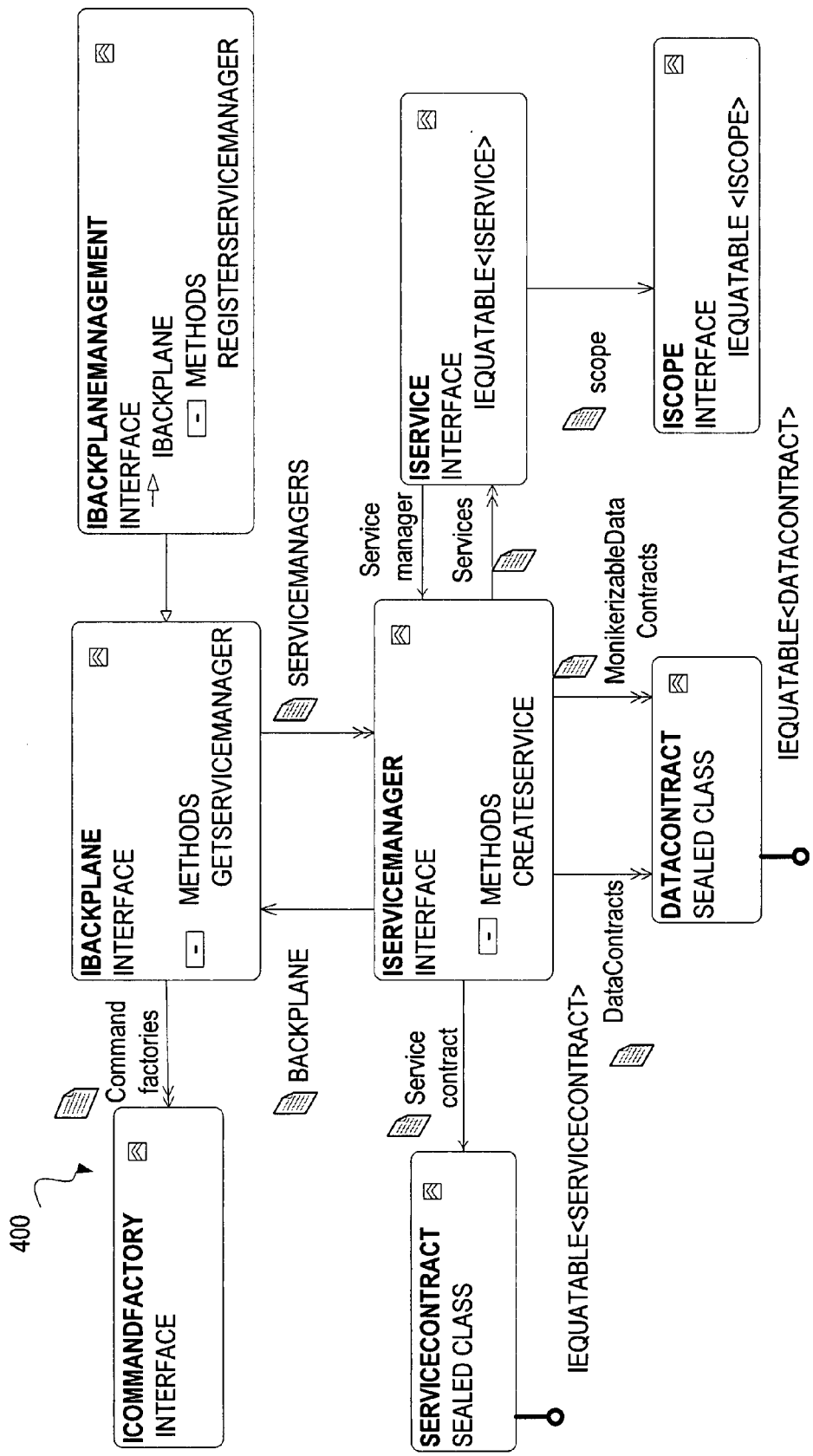
FIG. 7 is a logical diagram for one implementation of the system of FIG. 1 illustrating exemplary backplane architecture for implementing some or all of the techniques described herein.

FIG. 7 is a logical diagram 400 for one implementation of the system of FIG. 1 illustrating exemplary backplane architecture for implementing some or all of the techniques described herein.

Figure 8:
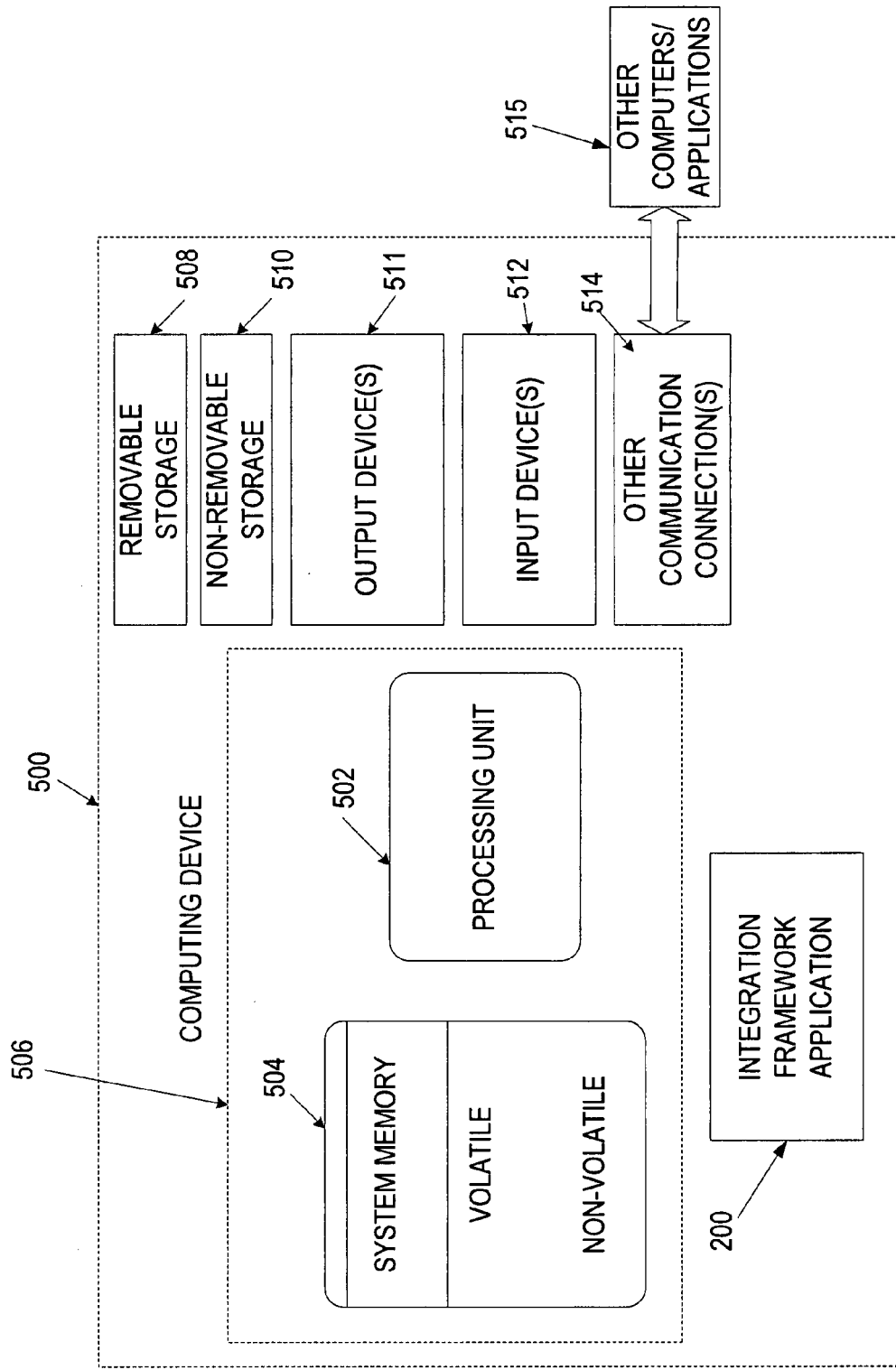
FIG. 8 is a diagrammatic view of a computer system on which one implementation may execute.

As shown in FIG. 8, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 8 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 8 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here. In one implementation, computing device 500 includes integration framework application 200, as described in FIG. 2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer storage medium having computer-executable instructions for causing a computer to perform steps comprising:
   enabling tools to be integrated together using an integration framework, the integration framework comprising a backplane to facilitate integration between tools;
   enabling the tools participating in the integration framework to be encapsulated in a manner that hides implementation details of the tools;
   enabling the tools participating in the integration framework to carry formal type definitions that describe the public behaviors offered by the tools, wherein the formal type definitions include service contracts that are defined in one or more interfaces and data contracts that are defined by one or more classes;
   receiving, by the backplane, a request from a client for a tool of a particular type for a particular scope; and
   providing information to the client regarding a particular tool conforming to the requested particular type for the particular scope, the information comprising a service contract and a data contract associated with the particular tool, the client calling a method on the particular tool defined by the service contract to invoke a behavior of the tool, the method returning information elements to the client based on the data contract.

2. The computer storage medium of claim 1, wherein the integration framework supports extensibility, whereby changes can be made to any of the tools, associated tool adapters, commands, or associated clients without breaking the integration between the tools.

3. The computer storage medium of claim 1, wherein the integration framework allows tool adapters and pluggable commands that make use of the integration framework to be shipped independently of each other and of the tools being integrated.

4. A method for providing a flexible integration framework comprising the steps of:
   providing an integration framework for enabling tools to be integrated, the integration framework comprising a backplane to facilitate integration between tools, the framework being operable to encapsulate tools in a manner that hides implementation details of the tools, thereby preventing the tools from taking deep dependencies on each other;
   enabling the tools participating in the integration framework to carry formal type definitions that describe the public behaviors offered by the tools, wherein the formal type definitions include service contracts that are defined in one or more interfaces and data contracts that are defined by one or more classes;
   receiving, by the backplane, a request from a client for a tool of a particular type for a particular scope; and
   providing information to the client regarding a particular tool conforming to the requested particular type for the particular scope, the information comprising a service contract and a data contract associated with the particular tool, the client calling a method on the particular tool defined by the service contract to invoke a behavior of the tool, the method returning information elements to the client based on the data contract.

5. The method of claim 4, wherein tools that were not designed to collaborate can be adapted to work with the integration framework.

6. The method of claim 4, wherein third parties can author one or more tool adapters for existing tools.

7. The method of claim 4, wherein changes to the implementation of a particular one of the tools is hidden from another one of the tools during a tool lifecycle.

8. A computer storage medium having computer-executable instructions for causing a computer to perform the steps recited in claim 4.

9. A method for supporting pluggable external commands in an integration framework comprising the steps of:
   enabling tools to be integrated together using an integration framework, the integration framework comprising a backplane to facilitate integration between tools;
   enabling the tools participating in the integration framework to be encapsulated in a manner that hides implementation details of the tools;
   enabling the tools participating in the integration framework to carry formal type definitions that describe the public behaviors offered by the tools, wherein the formal type definitions include service contracts that are defined in one or more interfaces and data contracts that are defined by one or more classes;
   receiving, by the backplane, a request from a client for a tool of a particular type for a particular scope;
   providing information to the client regarding a particular tool conforming to the requested particular type for the particular scope, the information comprising a service contract and a data contract associated with the particular tool, the client calling a method on the particular tool defined by the service contract to invoke a behavior of the tool, the method returning information elements to the client based on the data contract;
   supporting pluggable commands in the integration framework;

encapsulating integration logic within the pluggable commands; and providing blocks of reusable functionality within the pluggable commands that can be used by the tools participating in the integration framework, wherein the integration framework supports tool adapters, with each tool adapter presenting a public abstraction of an independent tool or a composition of components.

10. The method of claim 9, wherein command factories are used with the integration framework to hide command implementations from clients.

11. The method of claim 9, wherein command factories are registered with the integration framework so that clients can find and use them.

12. The method of claim 9, wherein the integration framework supports movement of integration logic out of the tools and into commands to reduce coupling between the tools.

13. The method of claim 9, wherein the integration framework enables tool adapters and the pluggable commands to be shipped independently to replace or extend functionality.

14. The method of claim 9, wherein the integration framework enables front end and back end separation of tools.

15. The method of claim 9, wherein the pluggable commands can manipulate participating tools through tool adapters integrated into the integration framework.

16. A computer storage medium having computer-executable instructions for causing a computer to perform the steps recited in claim 9.

* * * * *